United States Patent [19]

Lamarche

[11] 4,430,064

[45] Feb. 7, 1984

[54] SERIES DAMPER ROTARY AND FORCE VECTOR LAG CONTROL SYSTEM

[75] Inventor: Paul E. Lamarche, Utica, Mich.

[73] Assignee: Borg-Warner Corporation, Chicago, Ill.

[21] Appl. No.: 332,033

[22] Filed: Dec. 18, 1981

[51] Int. Cl.$^3$ .............................................. F16D 3/14
[52] U.S. Cl. .................................. 464/64; 192/106.2; 464/68; 464/82
[58] Field of Search .................. 464/68, 67, 66, 64, 464/81, 82; 192/106.2, 106.1, 70.17, 70.18, 105 BA, 103 B

[56] References Cited

U.S. PATENT DOCUMENTS

| | | | |
|---|---|---|---|
| 2,053,180 | 9/1936 | Carter | 464/82 |
| 2,214,602 | 9/1940 | Arnold | 192/106 |
| 2,826,902 | 3/1958 | DeCoursey | 192/106.2 |
| 4,232,534 | 11/1980 | Lamarche | 464/68 |
| 4,279,132 | 7/1981 | Lamarche | 464/64 |
| 4,304,107 | 12/1981 | Fall et al. | 464/64 |

FOREIGN PATENT DOCUMENTS

| | | | |
|---|---|---|---|
| 508262 | 12/1954 | Canada | 464/66 |
| 2610081 | 9/1977 | Fed. Rep. of Germany | 192/106.2 |
| 305304 | 2/1929 | United Kingdom | 464/66 |

*Primary Examiner*—John M. Jillions
*Assistant Examiner*—Daniel P. Stodola
*Attorney, Agent, or Firm*—James A. Geppert

[57] ABSTRACT

A vibration damper for a clutch having a built-in rotary sensitive and applied force lag control for an automotive vehicle adapted to reduce the tip-in and tip-out effects on the clutch, such as in an automotive lock-up clutch in a torque converter. The vibration damper includes a hub having radially extending fingers, and the lag control comprises friction lag plates received on each finger for generally outward radial movement relative to the hub to frictionally engage in a channel of a vibration damper housing under centrifugal force due to rotation of the assembly. The outward movement of the lag plates may be enhanced by a camming action or resilient spring between the hub finger and lag plate.

12 Claims, 6 Drawing Figures

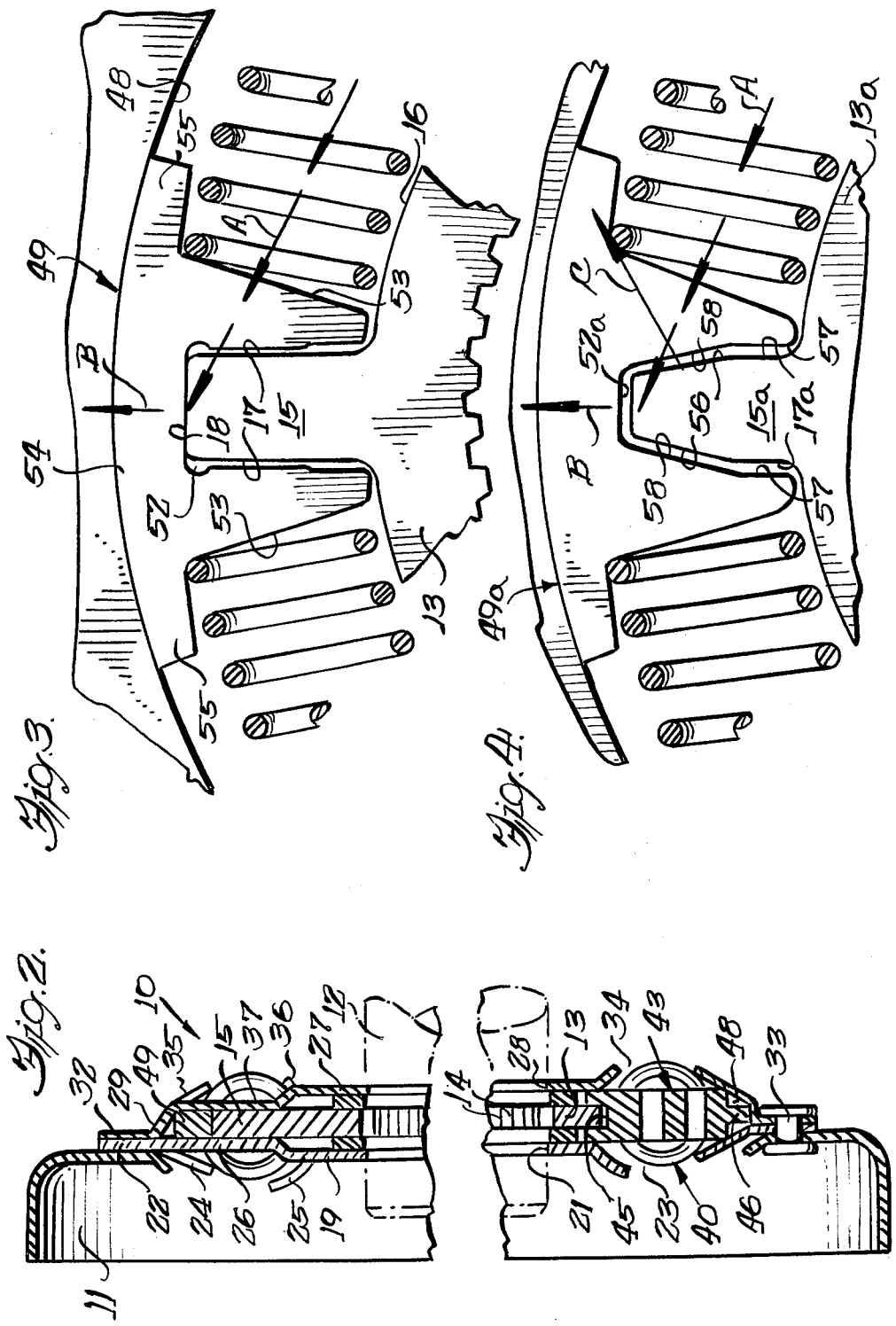

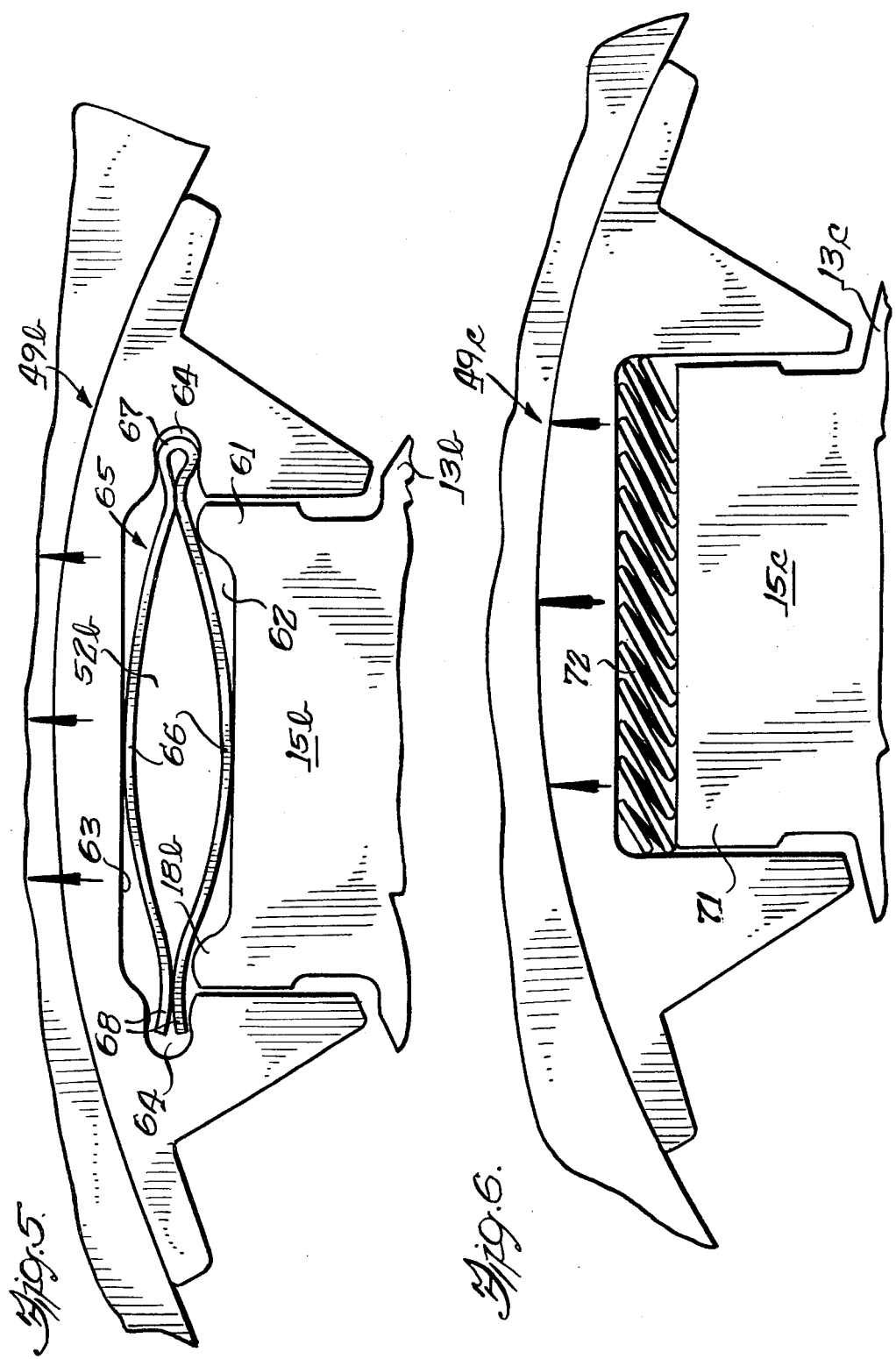

SERIES DAMPER ROTARY AND FORCE VECTOR LAG CONTROL SYSTEM

BACKGROUND OF THE INVENTION

The present invention relates to a built-in self-energizing friction lag system in an extended travel clutch vibration damper. A vibration damper is desirable in an automotive vehicle clutch to neutralize any torsional vibrations emanating from the vehicle engine, which would result in undesirable impact loads, vibration, noise, etc. A damper is conventionally utilized in a clutch for a manual transmission and is desirable for a lock-up clutch in a torque converter for an automatic transmission; one example of extended travel damper being shown in my U.S. Pat. No. 4,279,132. However, where the vehicle operator suddenly releases the accelerator pedal and/or quickly depresses the accelerator pedal, the sudden and rapid positive and negative torques result in a jerky uneven acceleration or deceleration of the vehicle; otherwise known as tip-in or tip-out of the vehicle clutch. The present invention acts to obviate the effects of the rapid positive and negative torques in a manual clutch or lock-up clutch in a torque converter.

SUMMARY OF THE INVENTION

The present invention comprehends the provision of a built-in self-energizing rotary sensitive and applied force lag control for a vibration damping device of an extended travel torsional damper for a vehicle clutch to provide proportional lag control. The damper assembly includes a hub member having radial fingers on its periphery, a damper housing formed of front and rear retainer plates with inwardly offset drive straps, spring sets in the housing between adjacent hub fingers with sliding spring separators between the spring sets, and a friction lag plate on each hub finger engaged by the adjacent spring sets and radially movable to frictionally contact a channel formed in the housing; the channel accommodating the outer edges of the lag plates and spring separators.

The present invention also comprehends the provision of an extended travel vibration damper assembly having a hub member with radial fingers, a friction lag plate received on each finger, and cooperating cam surfaces on the fingers and lag plates to enhance the outward radial movement of the lag plates into frictional engagement with the damper housing.

The present invention further comprehends the provision of an extended travel vibration damper assembly having a hub member with radial fingers, a friction lag plate received on each finger, and resilient means between each hub finger and lag plate to yieldably urge the friction lag plates radially outwardly to frictionally engage the damper housing.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view of the damper assembly taken on the irregular line 2—2 of FIG. 1.

FIG. 3 is an enlarged rear elevational view of a portion of the hub member including the radial finger and friction lag plate showing the force vectors acting on the lag plate.

FIG. 4 is an enlarged rear elevational view of a portion of the hub member showing a modified radial finger and a second embodiment of friction lag plate.

FIG. 5 is an enlarged rear elevational view of a portion of the hub member with a second modified hub finger and a third embodiment of friction lag plate and resilient means.

FIG. 6 is an enlarged rear elevational view of a portion of the hub member with a fourth embodiment of hub finger and friction lag plate and resilient means.

DESCRIPTION OF THE PREFERRED EMBODIMENTS

Figure 1:
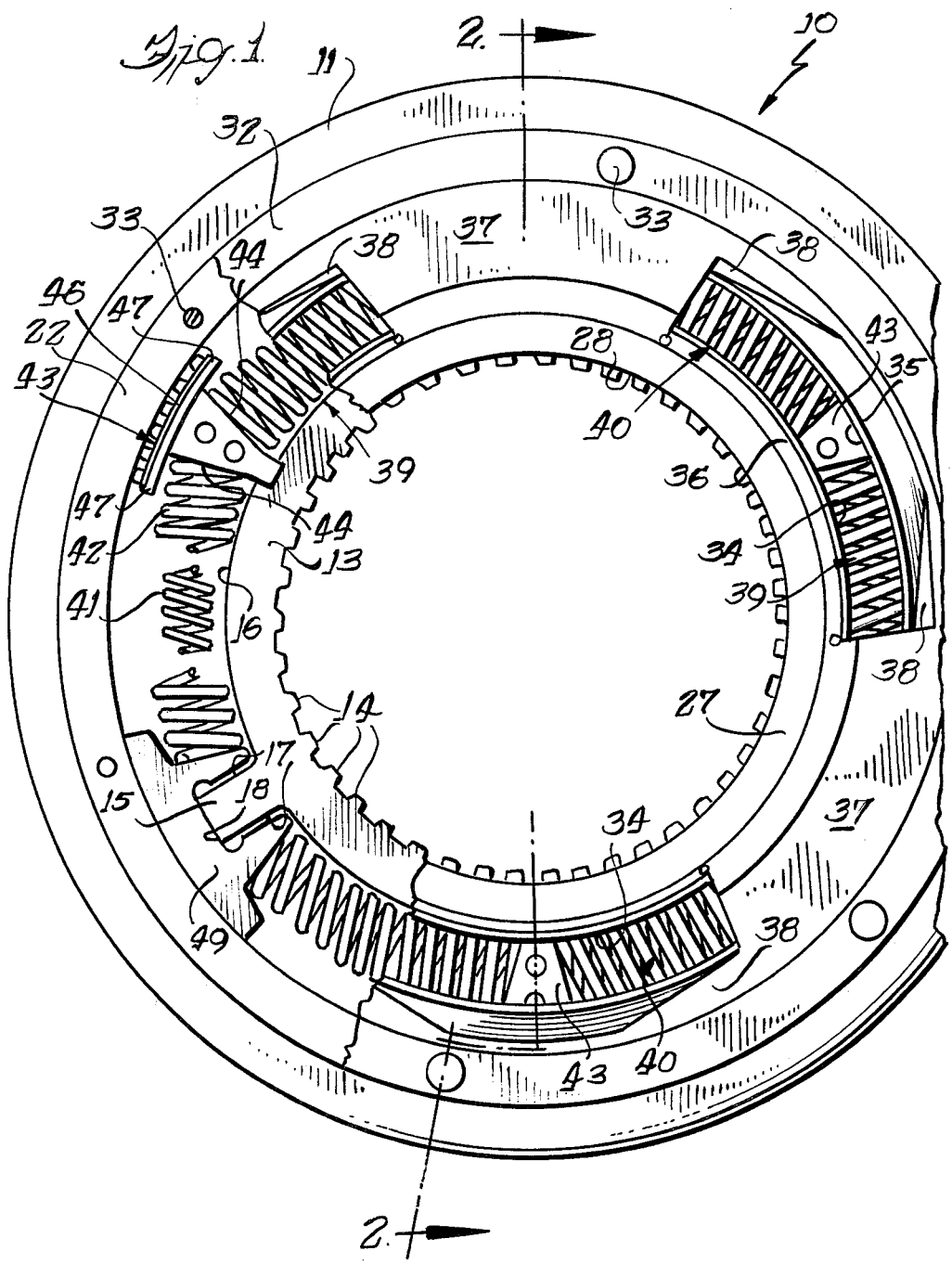
FIG. 1 is a rear elevational view with portions broken away of an extended travel vibration damper assembly including the self-energizing rotary sensitive and applied force lag control of the present invention.

Referring more particularly to the disclosure in the drawings wherein are shown illustrative embodiments of the present invention, FIGS. 1 and 2 disclose an extended travel vibration damper assembly 10 for connection to a torque input means or attaching ring 11 and to a torque output means 12. If the torque input means is a friction clutch plate for a manual transmission, then the torque output means is the transmission input shaft; however, if the torque input means is a piston plate for a lock-up clutch in a torque converter of an automatic transmission, then the torque output means is the hub for the turbine in the torque converter.

The vibration damper assembly includes a hub in the form of an annular ring or plate 13 having internal splines or teeth 14 on the inner periphery of the ring to engage the torque output means 12, and three circumferentially equally spaced radial hub fingers 15 are formed on the outer ring periphery 16. Each finger has a pair of generally parallel sides 17,17 terminating in a flat end surface 18. The hub is located in a vibration damper housing consisting of a front retainer plate 19 and a rear retainer plate 27. The front retainer plate is in the form of an annular ring having a central opening 21, a slightly rearwardly offset peripheral flange 22 and three equally spaced elongated arcuate slots 23 separated by slightly rearwardly offset drive straps 26 normally axially aligned with the hub fingers. The arcuate slots are each defined by an outer inclined lip 24 and an inner curved lip 25 acting to retain the damper springs therein; reentry ramps (not shown) being formed in the outer lips adjacent each drive strap 26.

The rear retainer plate 27 is also in the form of an annular ring having a central opening 28 and an outer axially forwardly extending wall 29 terminating in a peripheral flange 32; the flanges 22 and 32 abutting together and suitably secured to the attaching ring 11, such as by rivets 33. The plate 27 is provided with three equally spaced elongated arcuate slots 34 separated by forwardly offset drive straps 37. Each arcuate slot is defined by an outer inclined lip 35 and an inner inclined lip 36 acting to retain damper springs in the housing; the outer lips including reentry ramps 38 adjacent each drive strap.

Located within the housing are three groups or pairs of springs sets 39,40, with each group positioned between adjacent hub fingers 15. Each spring set consists of one or more concentric coil springs, such as the inner spring 41 and the outer spring 42 shown in FIG. 1. Positioned between each spring set in a group is a sliding spring separator 43 having a generally wedge-shaped body with outwardly diverging sides 44 extending to the inner end which has a central notch 45 receiving the outer periphery 16 of the hub ring 13 and to a narrowed arcuate outer edge 46 circumferentially extending beyond the sides in opposite ears 47; the narrow arcuate edge and ears sliding in a channel 48 formed in the housing and having the axial wall 29 as a channel base.

Mounted on each radial finger 15 is a friction lag plate 49 having a generally wedge-shaped body with a deep notch 52 therein generally complementary to the shape of the finger at the inner ends. The body has outwardly diverging edges 53,53 terminating in an outer arcuate edge 54 extending into circumferential ears 55 and which is slidably received in the channel 48. The spring sets 39,40 on the opposite sides of the friction lag plate 49 engage the edges 53 and the spring load or force vector is shown by the arrow A directed generally perpendicular to the edges 53. This force vector has a radial component acting to urge the lag plate radially outward into the channel 48.

Upon the application of torque through the attaching ring 11, the housing rotates with the ring 11 so that the aligned pairs of drive straps 26,37 engage the spring sets 39 to compress the springs against the spring separators 44, which slide in channel 48 to compress the spring sets 40. Spring sets 40 bear against the sides 53 of the friction lag plates 49 acting on the hub fingers 15 to rotate the hub plate 13. Rotation of the hub plate and fingers push or pull the friction lag plates, which offer resistance to movement in the channel 48 that is proportional to the centrifugal force (arrow B in FIG. 3) on the mass of the lag plates 49 and the spring force resulting from engine rpm and torque. The pairs of spring sets 39,40 between adjacent hub fingers and lag plates act in parallel during torque application with the spring sets in each group acting in series.

FIG. 4 discloses a second embodiment of friction lag plate 49a and hub finger 15a for the hub member 13a. Each radial finger 15a has a pair of side edges with lower parallel portions 17a and upper inclined camming portions 56. Likewise, the deep notch 52a of the friction lag plate 49a has complementary parallel lower edge portions 57 and upper camming portions 58. Thus, in use when pushed or pulled by the hub finger 15a, the lag plate is acted upon by the force vector of the spring sets (arrow A), centrifugal force (arrow B) and a wedging action due to the camming surfaces (arrow C) to urge the lag plate into frictional contact with the channel in the damper housing.

A third embodiment of lag control is shown in FIG. 5 wherein the radial fingers 15b on the hub member 13b each have an enlarged outer end 61 with a recess 62 in the outer end edge 18b. The friction lag plate 49b has a deep notch 52b with a recessed base portion 63 and rounded lateral enlargements 64 to receive an elliptical spring 65 having outwardly bowed arms 66,66 received in the opposed recesses 62,63, a central curl 67 received in one enlargement 64 and the ends 68,68 of the arms received in the other enlargement 64. In this embodiment, the spring vector force and the centrifugal force on the lag plate is aided by the resilient force of the spring 65.

FIG. 6 discloses a fourth embodiment of friction lag plate 49c on the radial finger 15c of the hub member 13c, wherein the friction lag plate and hub finger are substantially identical to that shown in FIGS. 1 through 3. In this embodiment, the finger may have an enlarged outer end 71 and a slant coil spring 72 is positioned in the notch 52c of the lag plate between the lag plate and the enlarged end 71 of the radial finger. This slant spring acts in the same manner as the elliptical spring of FIG. 5.

I claim:

1. A vibration damper assembly to transmit torque between driving and driven members, comprising an input member operatively connected to torque input means, a hub member operatively connected to torque output means and having at least two circumferentially equally spaced radial fingers thereon, at least one spring separator located between adjacent hub fingers and floating independently of said hub member, compression spring sets interposed between said hub fingers and spring separators, and a pair of retainer plates substantially enclosing said hub member, spring separators and spring sets and operatively connected to said input member, said retainer plates having axially aligned elongated arcuate slots separated by inwardly offset drive straps and adapted to receive and retain said spring sets, the improvement comprising a friction lag plate carried on and radially reciprocable to each hub finger, each lag plate having outwardly diverging edges terminating in an arcuate outer edge, said spring sets engaging the opposite diverging edges of each friction lag plate to provide a force vector acting to urge the lag plates radially outwardly to frictionally engage said retainer plates.

2. A vibration damper assembly as set forth in claim 1, wherein each friction lag plate has a deep notch extending from its inner edge complementarily receiving a hub finger therein.

3. A vibration damper assembly as set forth in claim 1, wherein said retainer plates form a circumferentially extending channel within which said friction lag plates and said spring separators are slidably movable.

4. A vibration damper assembly as set forth in claim 2, wherein each said hub finger has generally parallel side edges, and each said friction lag plate has the notch provided with complementary parallel edges to provide for radial movement thereof.

5. A vibration damper assembly as set forth in claim 2, including resilient means in the lag plate notch engaging the outer end of the radial hub finger.

6. A vibration damper assembly as set forth in claim 3, wherein said hub member has three equally spaced radial fingers, friction lag plate for each finger and having an arcuate outer edge extending circumferentially beyond the diverging edge to form opposite ears, a spring separator between adjacent hub fingers having a wedge-shaped body with an arcuate outer edge extending circumferentially beyond the body to form opposed ears, and three groups of two spring sets located between adjacent hub fingers with each spring separator between a pair of spring sets.

7. A vibration damper assembly as set forth in claim 6, in which said groups of spring sets act in parallel with the spring sets in each group acting in series.

8. A vibration damper assembly as set forth in claim 6, in which centrifugal force resulting from rotation of the hub member and the force vectors of the spring sets act on each friction lag plate to urge the plate radially outwardly into frictional engagement in said channel of the retainer plates to provide resistance to movement proportional to the centrifugal and spring forces resulting from engine rpm and torque.

9. A vibration damper assembly to transmit torque between driving and driven members, comprising an input member operatively connected to torque input means, a hub member operatively connected to torque output means and having at least two circumferentially equally spaced radial fingers thereon, at least one spring separator located between adjacent hub fingers and floating independently of said hub member, compression spring sets interposed between said hub fingers and spring separators, and a pair of retainer plates substantially enclosing said hub member, spring separators and spring sets and operatively connected to said input member, said retainer plates having axially aligned elongated arcuate slots separated by inwardly offset drive straps and adapted to receive and retain said spring sets, the improvement comprising a friction lag plate carried on and radially reciprocable to each hub finger, each lag plate having a deep notch extending from its inner edge complementarily receiving a hub finger therein and outwardly diverging edges terminating in an arcuate outer edge frictionally engaging said retainer plates, each hub finger having lower generally parallel side portions and upper generally inclined outwardly converging camming portions, and each lag plate has its notch provided with complementary parallel and camming edge portions.

10. A vibration damper assembly as set forth in claim 9, in which said complementary camming edges provide an additional force vector in addition to a spring force vector.

11. A vibration damper assembly to transmit torque between driving and driven members, comprising an input member operatively connected to torque input means, a hub member operatively connected to torque output means and having at least two circumferentially equally spaced radial fingers thereon, at least one spring separator located between adjacent hub fingers and floating independently of said hub member, compression spring sets interposed between said hub fingers and spring separators, and a pair of retainer plates substantially enclosing said hub member, spring separators and spring sets and operatively connected to said input member, said retainer plates having axially aligned elongated arcuate slots separated by inwardly offset drive straps and adapted to receive and retain said spring sets, the improvement comprising a friction lag plate carried on and radially reciprocable to each hub finger, each lag plate having a deep notch extending from its inner edge complementarily receiving a hub finger therein and outwardly diverging edges terminating in an arcuate outer edge frictionally engaging said retainer plates, and resilient means in the lag plate notch engaging the outer end of the radial hub finger, said resilient means comprising an elliptical spring, and recesses formed in the end of the hub finger and in the friction lag plate to accommodate the spring.

12. A vibration damper assembly to transmit torque between driving and driven members, comprising an input member operatively connected to torque input means, a hub member operatively connected to torque output means and having at least two circumferentially equally spaced radial fingers thereon, at least one spring separator located between adjacent hub fingers and floating independently of said hub member, compression spring sets interposed between said hub fingers and spring separators, and a pair of retainer plates substantially enclosing said hub member, spring separators and spring sets and operatively connected to said input member, said retainer plates having axially aligned elongated arcuate slots separated by inwardly offset drive straps and adapted to receive and retain said spring sets, the improvement comprising a friction lag plate carried on and radially reciprocable to each hub finger, each lag plate having a deep notch extending from its inner edge complementarily receiving a hub finger therein and outwardly diverging edges terminating in an arcuate outer edge frictionally engaging said retainer plates, and resilient means in the lag plate notch engaging the outer end of the radial hub finger, said resilient means comprising a slant coil spring extending horizontally across and located between the outer end of said hub finger and the inner end of said notch.

* * * * *